(12) United States Patent
Takeda et al.

(10) Patent No.: US 8,058,348 B2
(45) Date of Patent: Nov. 15, 2011

(54) POLYOLEFIN MICROPOROUS FILM

(75) Inventors: Hisashi Takeda, Tokyo (JP); Daisuke Inagaki, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 262 days.

(21) Appl. No.: 11/997,423

(22) PCT Filed: Jul. 27, 2006

(86) PCT No.: PCT/JP2006/314871
§ 371 (c)(1),
(2), (4) Date: Jan. 31, 2008

(87) PCT Pub. No.: WO2007/015416
PCT Pub. Date: Feb. 8, 2007

(65) Prior Publication Data
US 2010/0099838 A1    Apr. 22, 2010

(30) Foreign Application Priority Data
Aug. 3, 2005  (JP) ................................. 2005-225407

(51) Int. Cl.
C08F 8/00        (2006.01)
C08F 110/00      (2006.01)
C08L 23/00       (2006.01)
C08L 23/04       (2006.01)
C08L 23/10       (2006.01)
C08K 5/00        (2006.01)
C08J 9/28        (2006.01)
B29C 49/34       (2006.01)
H01M 2/16        (2006.01)

(52) U.S. Cl. .......... 525/191; 525/240; 524/515; 521/64; 521/142; 521/143; 429/247

(58) Field of Classification Search .................. 525/191, 525/240; 524/515; 521/64, 142, 143; 429/247
See application file for complete search history.

(56) References Cited

U.S. PATENT DOCUMENTS

| | | | |
|---|---|---|---|
| 6,054,498 A | * | 4/2000 | Hasegawa et al. .............. 521/64 |
| 2003/0168764 A1 | | 9/2003 | Nishida et al. |

FOREIGN PATENT DOCUMENTS

| | | |
|---|---|---|
| JP | 9-12756 | 1/1997 |
| JP | 10-298324 | 11/1998 |
| JP | 2004-196870 | 7/2004 |
| JP | 2004-196871 | 7/2004 |
| JP | 2005-200578 | 7/2005 |
| JP | 3699561 | 7/2005 |
| KR | 2003-24707 | 3/2003 |
| WO | WO 97/23554 | 7/1997 |
| WO | WO 02/092677 A1 | 11/2002 |

OTHER PUBLICATIONS

Molecular Weight, Polymer Science Learning Center, Department of Polymer Science, The University of Southern Mississippi http//:pslc.ws/mactest/weight.htm.*

* cited by examiner

*Primary Examiner* — Nathan M Nutter
(74) *Attorney, Agent, or Firm* — Finnegan, Henderson, Farabow, Garrett & Dunner, L.L.P.

(57) ABSTRACT

A polyolefin microporous film comprising polyethylene and polypropylene having a viscosity average molecular weight of 100,000 or higher, the polypropylene being contained in an amount of 4 wt % or more and the terminal vinyl group concentration per 10,000 carbon atoms in the polyolefin constituting the microporous film being 2 or more as measured by infrared spectroscopy. The microporous film has both of a good film breaking resistance and a low thermal shrinkage, is excellent in fuse property, and has a uniform film thickness. Particularly, the microporous film can retain safety in the oven safety test at 150° C. for a battery which is required for use as a lithium ion battery separator.

11 Claims, 2 Drawing Sheets

[Figure 1]
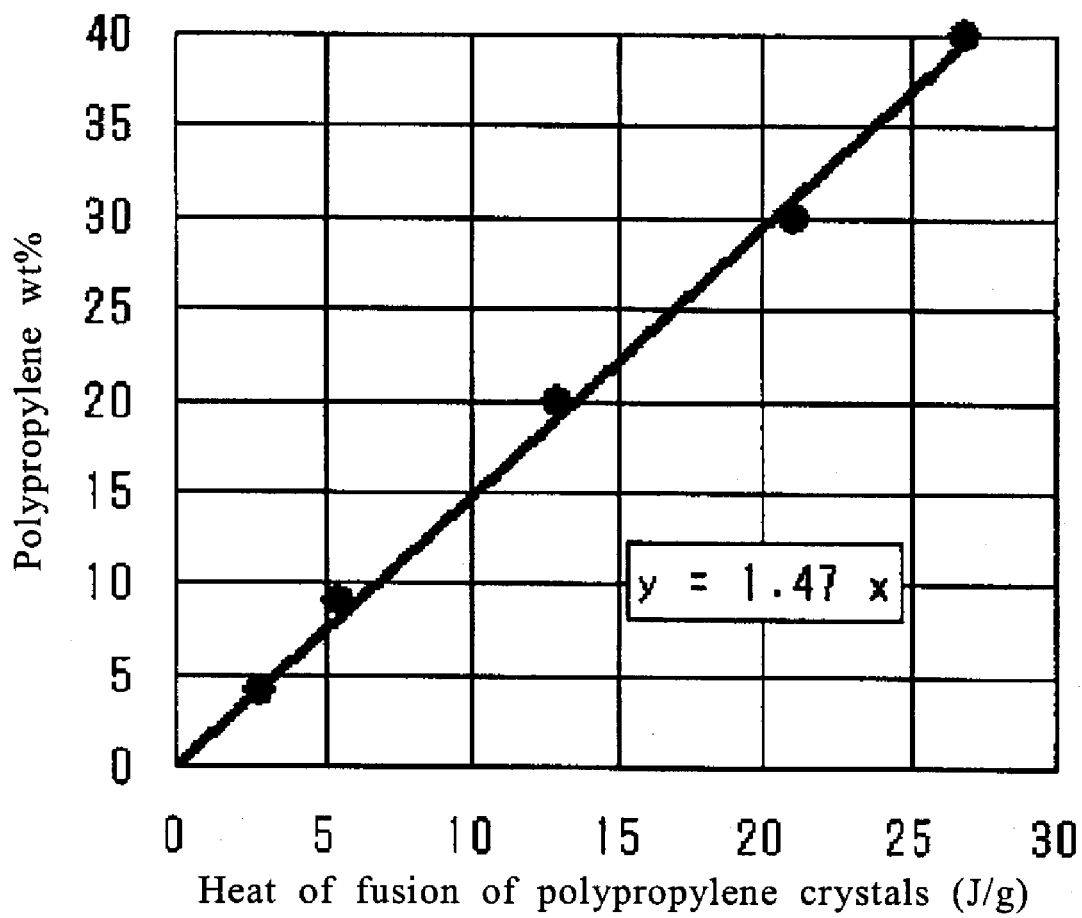

[Figure 2]
(A)
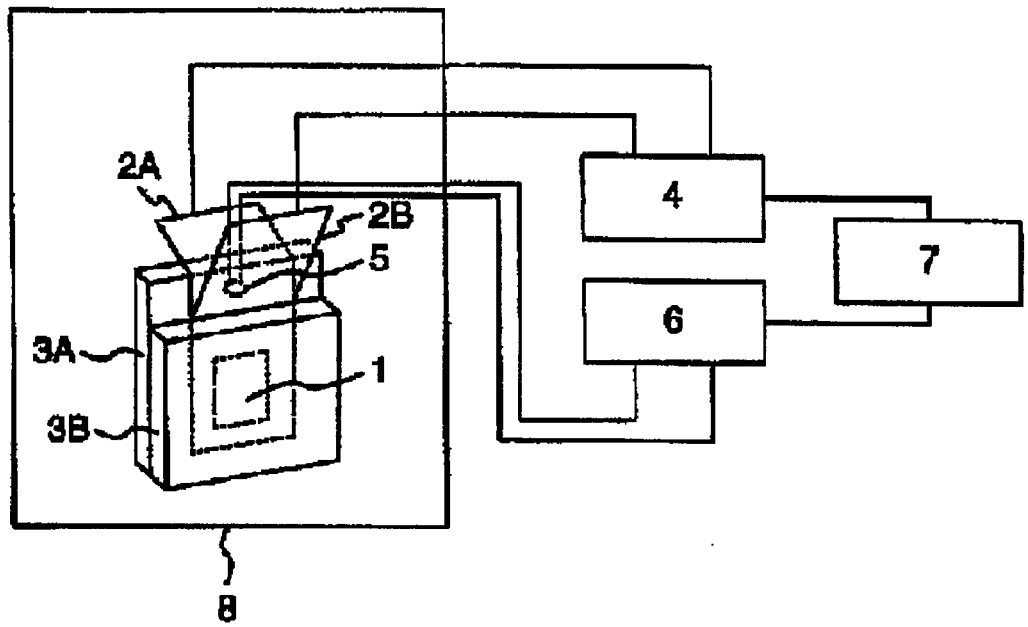
(B)
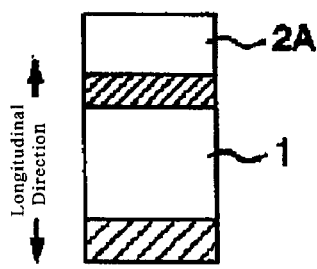
(C)
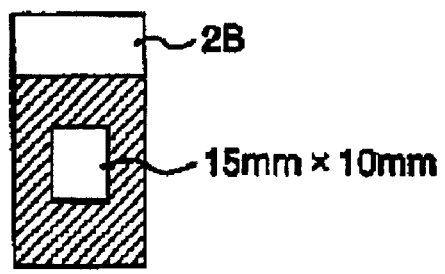

POLYOLEFIN MICROPOROUS FILM

TECHNICAL FIELD

The present invention relates to a polyolefin microporous film, particularly a polyolefin microporous film suitable for use in a separator for lithium-ion batteries.

BACKGROUND ART

Polyolefin microporous films are used as microfiltration membranes, separators for batteries, separators for condensers, materials for fuel cells, etc. Among these applications, the use of the microporous films as separators for batteries, particularly separators for lithium-ion batteries, requires that the polyolefin microporous films are excellent in ionic permeability, mechanical strength and the like.

In addition, separators for recent high capacity batteries have been required to have a "fuse effect", "film-rupture resistance" and "low heat shrinkability" to secure the safety of the batteries and to be less variable in film thickness to reduce the variation of battery characteristics.

The "fuse effect" refers to a mechanism in which, when the inside of a battery is overheated during overcharge or the like, the separator melts, forms a coat covering an electrode and interrupts the current to secure the safety of the battery. For a polyethylene microporous film, the fuse temperature, i.e., the temperature at which the fuse effect is exhibited, is known to be roughly in the neighborhood of 140° C. However, a lower fuse temperature is considered to be better to stop a thermal runaway reaction and the like in the battery as soon as possible.

The "film-rupture resistance" refers to the performance of the separator, in which film breakage is prevented even when the separator is heated to not less than the fuse temperature. In addition, the "low heat shrinkability" refers to the performance thereof, in which heat shrinkage occurs only slightly even when the separator is heated to not less than the fuse temperature. Both performances are considered to be necessary for maintaining the shape thereof even after melting to keep the insulation between the electrodes.

Separators for batteries are each required to have a performance satisfying the safety evaluation criteria for batteries as prescribed in "Standard for Lithium Batteries" of U.S. standard UL1642 to assure the battery safety at 150° C. The evaluation is carried out by keeping a separator in an oven at 150° C. for 10 minutes. To achieve the criteria, it is desired that the separator is made non-porous by fusing at 130° C. to 140° C. and is not broken with minimal heat shrinkage even when heated at 150° C. or higher, thereby maintaining the shape thereof.

The "a small variation in film thickness" is an important performance for stably obtaining the above battery performance. The variation in film thickness of the separator has sometimes made it impossible to stably achieve the above fuse effect, film-rupture resistance and low heat shrinkability. The change of the distance between the positive and negative electrode plates also leads to the variation of the performance of individual batteries; for example, the use of the film causing the changed distance in pack batteries in notebook computer applications has further increased the variation in some cases, resulting in a reduction in yield. The film formation itself has also sometimes been difficult, leading to a decrease in yield.

Known techniques in which the film-rupture resistance of polyolefin microporous films has been improved include, for example, those described in Patent Documents 1 and 2.

Patent Document 1 discloses a polyolefin microporous film whose shape retention during melting is improved by blending polypropylene, which has a melting point higher than that of polyethylene. However, in the Example using the technique, a quality disadvantage has been found that particles are left in the resultant polyolefin microporous film because of the blending of a polyolefin composition containing a polyethylene having a weight average molecular weight of more than 2,500,000 with a polypropylene having a weight average molecular weight of the order of 500,000.

Patent Document 2 discloses a polyolefin microporous film characterized in that it contains as essential components a polyethylene having a certain viscosity average molecular weight and 7 to 50 wt % of polypropylene and in that the correlation between the molecular weight and terminal methyl group concentration determined using GPC/FTIR satisfies a particular relationship. However, this invention is intended to improve the oxidation resistance of the separator; it is hard to say that the film thickness uniformity and the lower heat shrinkage of the separator have been sufficiently achieved.

In addition, techniques in which it has been tried to uniformize the thickness of a polyolefin microporous film while improving the film-rupture resistance include that described in patent document 3. This document discloses a polyolefin microporous film containing a polypropylene having a weight average molecular weight of 500,000 or more and a melting heat of 90 J/g or more as measured by differential scanning calorimetry. The microporous film is described to feature excellence in film thickness uniformity. In the invention, the use of the polypropylene having a melting heat of 90 J/g or more can be interpreted to make excellent the dispersibility of polypropylene, thereby enabling the improvement of the film thickness distribution. However, blending polyethylene and polypropylene broadens the film thickness distribution owing to reduced melt viscosity, which has not been improved yet. In addition, it is described in the Examples that the standard deviation of the film thickness distribution (film thickness variation) achieved in the present invention was 1.7 to 2.8; however, these values have been unsatisfactory for improvement of the film thickness distribution.

With respect to low heat shrinkability, a method such as that described in patent document 4 is known which involves subjecting the separator to heat setting and thereby reducing the heat shrinkage. However, although the heat setting of the separator can reduce heat shrinkage at up to around the melting point of polyethylene, it has had a problem that the separator thermally shrinks inside the battery when reaching the temperature of 150° C. required in the safety criteria, which results in the short circuit between the electrodes. Thus, there has been a need for development of a separator having lower heat shrinkability.

It is also hard to say that the separators obtained in the above patent documents 1 to 4 have fuse effects improved compared to before; the characteristics cannot be said to have reached a satisfactory level.

As a technique for improving the film-rupture resistance, the present inventor discloses, in patent document 5, a polyethylene microporous film comprising a high-density or linear copolymer polyethylene having a terminal vinyl group concentration of 2 or more/10,000 carbon atoms in the polyethylene as determined by infrared spectroscopy. The microporous film has good film-rupture resistance, which has, however, been less than sufficient yet. Neither indication nor disclosure of a method for thinning the microporous film and narrowing the film thickness distribution is also not given.

Thus, it has represented a challenge to develop a separator combining improved film-rupture resistance, a good fuse effect and low heat shrinkability and also having uniform film thickness.

[Patent Document 1] Japanese Patent No. 3699561
[Patent Document 2] JP-A-2005-200578
[Patent Document 3] JP-A-2004-196870
[Patent Document 4] JP-A-09-012756
[Patent Document 5] Japanese Patent No. 3177744

DISCLOSURE OF THE INVENTION

An object of the present invention is to provide a polyolefin microporous film which combines film-rupture resistance and low heat shrinkability and also is excellent in a fuse effect and quality.

Problems to be Solved by the Invention

Means for Solving the Problems

As a result of intensive studies for achieving the above object, the present inventors have found that a polyolefin microporous film comprising a particular polyethylene and polypropylene and having a terminal vinyl group concentration of 2 or more/10,000 carbon atoms in the polyolefin constituting the microporous film as determined by infrared spectroscopy is not only excellent in film-rupture resistance during melting but also low in heat shrinkability even when the inside of the battery has reached a high temperature of not less than the melting point thereof.

It has also been found that the film thickness distribution (particularly, the film thickness distribution in the MD direction) can be improved in addition to the above when the polyolefin microporous film comprises 7 to 30 wt % of a polypropylene having a viscosity average molecular weight of 100,000 or more and has a terminal vinyl group concentration of 4 or more/10,000 carbon atoms in the polyolefin constituting the microporous film as determined by infrared spectroscopy.

Specifically, the present invention is as follows.

[1] A polyolefin microporous film comprising a polyethylene and a polypropylene having a viscosity average molecular weight of 100,000 or more, characterized in that the polyolefin microporous film has a content of the polypropylene of 4 to 30 wt % and a terminal vinyl group concentration of 2 or more per 10,000 carbon atoms in the polyolefin constituting the microporous film as determined by infrared spectroscopy.

[2] The polyolefin microporous film described in item [1] above, characterized in that the microporous film comprises 7 to 30 wt % of the polypropylene.

[3] The polyolefin microporous film described in item [2], characterized in that the terminal vinyl group concentration per 10,000 carbon atoms in the polyolefin constituting the microporous film is 4 or more.

[4] The polyolefin microporous film described in item [2], characterized in that the microporous film comprises 9 to 30 wt % of a polypropylene having a viscosity average molecular weight of from 100,000 or more to less than 1,000,000.

[5] The polyolefin microporous film described in item [2], characterized in that the microporous film comprises 15 to 30 wt % of a polypropylene having a viscosity average molecular weight of from 100,000 or more to less than 1,000,000.

[6] The polyolefin microporous film described in item [3], characterized in that the terminal vinyl group concentration per 10,000 carbon atoms in the polyolefin constituting the microporous film is 5 to 20.

[7] The polyolefin microporous film described in item [3], characterized in that the terminal vinyl group concentration per 10,000 carbon atoms in the polyolefin constituting the microporous film is 6 to 20.

[8] The polyolefin microporous film described in item [3], characterized in that the microporous film comprises 20 to 93 wt % of a polyethylene having 5 to 20 terminal vinyl groups and 7 to 30 wt % of a polypropylene having a viscosity average molecular weight of from 100,000 or more to less than 1,000,000 and has a terminal vinyl group concentration of 4 to 20 per 10,000 carbon atoms in the polyolefin constituting the microporous film.

[9] The polyolefin microporous film described in item [3] or [8] above, characterized in that the microporous film comprises a polyethylene having 5 to 20 terminal vinyl groups and comprising 0.5 to 10 wt % of a component having a weight average molecular weight of 1,000 or less as determined by gel permeation chromatography.

[10] A separator for batteries, using the polyolefin microporous film described in any of items [1] to [9] above.

[11] A battery using the polyolefin microporous film described in any of items [1] to [9] above.

Advantages of the Invention

The polyolefin microporous film of the present invention has both film-rupture resistance and low heat shrinkability achieved, is excellent in a fuse effect, and also has uniform film thickness. Thus, the use of the polyolefin microporous film of the present invention, particularly as a separator for batteries, can improve battery safety and enhance yield in battery production.

BRIEF DESCRIPTION OF THE DRAWINGS

FIG. 1 is a calibration curve indicating the relation of the propylene content (wt %) to the heat of fusion of propylene crystals according to the present invention; and FIG. 2 is a schematic drawing of a device according to the present invention for measuring fuse temperature and short-circuit temperature.

BEST MODE FOR CARRYING OUT THE INVENTION

A preferred form of the present invention is described below in detail.

The polyethylene used in the present invention may be a polyethylene having a terminal vinyl group concentration of 2 or more/10,000 carbon atoms (hereinafter referred to as PEa) or a mixture of a polyethylene having the concentration of 1 or less (hereinafter referred to as PEb) and the above PEa.

PEa and PEb are each essentially a polymer consisting mainly of ethylene units; however, each may be a copolymer of ethylene with an α-olefin such as propylene, butene, pentene, hexene and octene. The content of the α-olefin based on the ethylene units is preferably 0.1 mole % or more in view of lowering the fuse temperature of the polyolefin microporous film and preferably 2 mole % or less in view of preventing the decreased crystallinity of the copolymer and the reduced permeability of the microporous film associated therewith. More preferred is 0.1 to 1 mole %.

In the polyethylene and polyolefin microporous films used in the present application, the weight fractions of components having molecular weights of 1,000 or less and 1,000,000 or more and the molecular weight distributions are values determined by gel permeation chromatography (hereinafter referred to as GPC). Specifically, GPC manufactured by Waters Japan Co. Ltd. (trade name: 150-GPC) was used; as columns, one SHODEX AT-807S column and two TOSO TSK-GEL GMH-6H columns were employed by joining together; and the measurement was performed at a column temperature of 140° C. using 1,2,4-trichlorobenzene as a solvent. Polystyrene-converted molecular weight distribution data were obtained based on a calibration curve prepared using a commercial monodisperse polystyrene as a standard substance. Then, the above values were determined using the polyethylene-converted molecular weight distribution data obtained by multiplying the polystyrene-converted molecular weight distribution data by 0.43 (Q factor of polyethylene/Q factor of polystyrene=17.7/41.3).

To efficiently produce a polyolefin microporous film satisfying the requirements of the present invention, the PEa used preferably has a terminal vinyl group concentration of 3 groups per 10,000 carbon atoms in the polyethylene (hereinafter expressed as 3/10,000 C) or more, more preferably 5/10,000 C or more, sill more preferably 6/10,000 C or more, most preferably 8/10,000 C or more. The concentration is preferably 20/10,000 C or less, more preferably 15/10,000 C or less in view of preventing the heat deterioration of PEa during melt kneading. Examples of PEa whose terminal vinyl group concentration is in the above range include polyethylene (B) disclosed in Japanese Patent Publication No. 01-12777, which can be produced by performing suspension polymerization, solution polymerization, gas phase polymerization, or the like using a chromium compound-supported catalyst combined with an organometal compound. The terminal vinyl group concentration can be adjusted by properly setting the active state of the catalyst, polymerization time, polymerization temperature and the like.

The density of PEa is preferably 0.90 to 0.98 g/cm$^3$, more preferably 0.93 to 0.97 g/cm$^3$, still more preferably 0.94 to 0.96 g/cm$^3$. The density is preferably 0.90 g/cm$^3$ or more because less than 0.90 g/cm$^3$ makes it difficult to render the microporous film porous; PEa having a density of more than 0.98 g/cm$^3$ is hard to obtain.

The viscosity average molecular weight (hereinafter referred to as Mv) of PEa is preferably 100,000 to 3,000,000. The Mv of PEa of 100,000 or more makes suitable the mechanical strength of the microporous film; 3,000,000 or less renders its processing easy. More preferred is 200,000 to 2,000,000, still more preferably 300,000 to 800,000. The proportion of the component having a molecular weight of 1,000,000 or more contained in PEa is preferably 0.5% or more, more preferably 1.0% or more, still more preferably 3.0% or more in view of processing.

The crystalline melting point of PEa is preferably 125° C. or higher, more preferably 130° C. or higher, still more preferably 132° C. or higher, most preferably 134° C. to 150° C. (inclusive) because a microporous film having a uniform porous structure is obtained.

The molecular weight distribution (weight average molecular weight (Mw)/number average molecular weight (Mn)) of PEa is preferably 8 to 40 (inclusive), more preferably 10 or more, still more preferably 12 or more, most preferably 14 to 20 (inclusive) in view of making less the film thickness nonuniformity. To render PEa well processable, PEa can also be used by adjusting the molecular weight distribution thereof in the range of roughly 10 to 60 using means such as two-stage polymerization and blending. For example, PEa as disclosed in the above Japanese Patent Publication No. 01-12777 is preferable.

The terminal vinyl group concentration of PEa in the polyolefin microporous film can be identified using GPC/FTIR. Specifically, the concentration can be assessed according to whether vinyl group absorption is identified at 910 cm$^{-1}$ or not.

Examples of PEb include polyethylene (A) disclosed in the above Japanese Patent Publication No. 01-12777, which can be produced by two-stage suspension, solution or gas phase polymerization or the like using a Ziegler catalyst containing a magnesium compound.

The density of PEb is preferably 0.90 to 0.98 g/cm$^3$, more preferably 0.93 to 0.97 g/cm$^3$, still more preferably 0.94 to 0.96 g/cm$^3$. The density is preferably 0.90 g/cm$^3$ or more because less than 0.90 g/cm$^3$ makes it difficult to render the microporous film porous; PEb having a density of more than 0.98 g/cm$^3$ is hard to obtain.

The Mv of PEb is preferably 100,000 or more in view of the mechanical strength of the microporous film and preferably 3,000,000 or less in view of processing. More preferred is 200,000 to 2,000,000, still more preferably 300,000 to 800,000.

The molecular weight distribution (weight average molecular weight (Mw)/number average molecular weight (Mn)) of PEb is preferably 2 to 10 (inclusive), more preferably 4 to 10 (inclusive) to uniformly melt-knead with PEa. To achieve a broader molecular weight distribution for the purpose of making better the moldability of PEb, PEb can be used by adjusting the molecular weight distribution thereof in the range of roughly 10 to 60 using a means such as two-stage polymerization and blending. The molecular weight distribution can be determined by the above method.

The blending ratio of the above PEa and PEb is not particularly limited provided that the resultant terminal vinyl group concentration of the polyolefin microporous film does not depart from the range according to the present invention and is in the range not impairing the advantages of the present invention. For example, PEa/PEb=10/0 to 1/9. Several types of PEa's and PEb's may be blended for use.

Containing 0.5 wt % or more of a component having a molecular weight of 1,000 or less in the polyethylene used in the present invention is preferable in that it can make the fuse temperature lower. More preferred is 0.8 wt % or more, still more preferably 1.0 wt % or more. In view of preventing the reduced mechanical strength of the film, preferred is 10 wt % or less, more preferably 5.0 wt % or less.

The component having a molecular weight of 1,000 or less can be measured by the above GPC and may be from any resin constituting the polyolefin microporous film, preferably from PEa or a polyethylene comprising 50 wt % or more of PEa.

The component with a molecular weight of 1,000 or less from PEa in the polyolefin microporous film can be identified by measuring the terminal vinyl group distribution in the polyolefin microporous film using GPC/FTIR. Specifically, its presence can be determined according to whether the vinyl group absorption at 910 cm$^{-1}$ is identified or not, using FTIR, in the component with a molecular weight of 1,000 or less. The terminal vinyl group concentration of PEa contained in the polyolefin microporous film can also be identified using GPC/FTIR.

Low density polyethylene, polymethylpentene, or the like may be blended into the above PEa or a blend composition of PEa and PEb in such a range that the resultant terminal vinyl group concentration of the polyolefin microporous film does not impair the advantages of the present invention.

The polypropylene used in the present invention may be homopolypropylene, ethylene-propylene random copolymer, ethylene-propylene block copolymer, or the like. The copolymers preferably have an ethylene content of 1.0 wt % or less in view of not reducing the crystallinity of the polypropylene and the permeability of the microporous film.

It is preferable that the My of the polypropylene is 100,000 or more in view of the mechanical strength of the resultant microporous film and less than 1,000,000 in view of processing. More preferred is 200,000 to 800,000, still more preferably 400,000 to 800,000.

The crystalline melting point of the polypropylene is preferably 155° C. or higher, more preferably 160° C. to 165° C. (inclusive) in view of improving the heat resistance of the microporous film.

The content of the polypropylene is required to be 4 to 30 wt % or less based on the whole polyolefin microporous film of the present invention to keep its formation and film thickness in a uniform manner. In view of achieving stable film formation and making the film thickness more uniform, the content is preferably 7 to 30 wt % or less, more preferably 9 to 30 wt % or less, most preferably 15 to 25 wt % or less.

When polypropylene is blended in polyethylene, the overall resin viscosity generally tends to be reduced compared to the resin viscosity when polyethylene is used alone because polypropylene has lower viscosity than that of polyethylene having the same molecular weight. A polypropylene content of 4 wt % or more based on the polyolefin microporous film markedly reduces the melt viscosity, which makes the step of stretching the polyolefin microporous film susceptible to temperature irregularity or the like in a stretching machine and produces a film thickness distribution resulting from thickness deviation. However, the present invention can prevent this because the microporous film contains PEa, resulting in making uniform the thickness of the polyolefin microporous film.

The reason why the thickness of the microporous film of the present invention is thus made uniform is not necessarily apparent, but is probably as follows. PEa is known to tend to have about one long chain branch per 10,000-carbon chain in addition to at least two terminal vinyl groups in the polyethylene molecular chain. The formation mechanism of the long chain branching is not perfectly elucidated even now; however, the branching is thought to be formed when a macromonomer having a vinyl group in the molecular chain terminal is consumed in the propagation reaction. Thus, PEa having many terminal vinyl groups is estimated to be large in the number of long chain branching per 10,000-carbon chain (long chain branching concentration).

Generally, a polyethylene having long chain branching features having a high viscosity at a low shear rate and tends to have increased extensional viscosity. Thus, a higher terminal vinyl group concentration is estimated to make the effect of long chain branching more marked. It is probable that blending polypropylene in the polyethylene may enable the suppression of the reduced resin viscosity and the prevention of the thickness nonuniformity during stretching.

According to the present invention, it is important to evaluate the uniformity of the film by observing the thickness nonuniformity in the stretching direction (MD) of a stretching device. The reason is as follows.

The thickness nonuniformity of a microporous film typically generates mainly due to the temperature variation in the MD and TD (width direction) and the reduced melt viscosity of source material polymers. The stretching device is composed of several temperature control rooms being greater in the width direction than the MD, which makes less uniform the temperature in the width direction. This generally allows the temperature in the TD to vary more widely than that in the MD. Thus, an attempt to estimate the effect of the source material polymers on film thickness nonuniformity requires also considering the factor of the temperature variation, which cannot give a proper estimate. In contrast, the temperature in the MD varies narrowly since it is uniform from the above reason. Thus, it is suitable for assessing the effect of the melt viscosity of the source material polymers on the film thickness variation. Less film thickness nonuniformity in the MD also results in improved film thickness nonuniformity in the TD. In addition, a battery separator is frequently used in a shape whose MD dimension is 10 to 400 times the TD dimension thereof; thus, it also is often important in view of enhancing the battery performance to suppress the thickness nonuniformity in the MD rather than that in the TD.

In the polyolefin microporous film of the present invention, both thickness nonuniformity in the stretching and width directions can be improved because the problems can be solved of both the effect of variation in the temperature control in the processing device and the effect of the reduced melt viscosity of the source material.

The thickness nonuniformity-preventing effect also enables the production of a polypropylene-blended polyolefin microporous film 10 μm or less in thickness having uniform thickness distribution, which has conventionally been difficult to produce. In addition, the effect has enabled the addition of a polymer component having a molecular weight of 1,000 or less, which has previously been incapable of being positively added as further reducing the melt viscosity.

Further, the polyolefin microporous film of the present invention has low shrinkage when used as a battery separator, though it has a thermal shrinkage comparable to those of conventional microporous films. Although the mechanism is uncertain, an implication is that it is due to the terminal vinyl groups in PEa exhibiting adhesion to the electrode when reaching a high temperature state.

The polyolefin microporous film of the present invention has a terminal vinyl group concentration of 2 per 10,000 carbon atoms in the polyolefin (hereinafter expressed as 2/10,000 C) or more to reduce film thickness nonuniformity and achieve low heat shrinkage. The concentration is preferably 4/10,000 C or more, more preferably 5/10,000 C or more, still more preferably 6/10,000 C or more. To prevent the heat deterioration of the polyolefin microporous film due to the reaction of the terminal vinyl groups, the terminal vinyl group concentration is preferably 20/10,000 C or less, more preferably 15/10,000 C or less.

According to the present invention, the polyolefin microporous film preferably has a molecular weight of 200,000 to less than 1,000,000, more preferably 200,000 to 800,000, still more preferably 200,000 to 600,000 as polyethylene-converted Mv. Preferred is 200,000 or more in view of the mechanical strength of the polyolefin microporous film and less than 1,000,000 in view of film formation stability.

The terminal vinyl group concentration and molecular weight of the above microporous film may be adjusted according to the types and composition ratio of polyethylene and polypropylene as source material resins, as described later.

The polyolefin microporous film of the present invention preferably has a thickness of 3 μm to 50 μm, more preferably 3 μm to 30 μm. The thickness is preferably 3 μm or more in view of mechanical strength and preferably 50 μm or less in view of the permeability of the microporous film.

According to the present invention, the MD film thickness deviation is preferably less than 3%. The MD film thickness deviation of less than 3% can prevent battery failure and battery performance deterioration resulting from the separator thickness nonuniformity. The MD film thickness deviation is more preferably 2% or less, still more preferably 1.5% or less. To set the deviation to the range, the temperature control capability of the stretching device may be properly adjusted.

According to the present invention, the polyolefin microporous film preferably has a porosity of 20 to 80%, more preferably 30 to less than 50%. The porosity is preferably 20% or more in view of the permeability of the microporous film and preferably 80% or less to achieve mechanical strength.

According to the present invention, the polyolefin microporous film preferably has a air permeability of 10 to 2,000 seconds, more preferably 50 to 1,000 seconds, still more preferably 50 to 800 seconds, further still more preferably 150 to 800 seconds, most preferably 150 to 600 seconds. To achieve moderate mechanical strength, 10 seconds or more is preferable; in view of permeability, 2,000 seconds or less is preferable.

According to the present invention, the polyolefin microporous film preferably has a puncture strength of 1 to 12 N/16 μm, more preferably 2 to 10 N/16 μm, still more preferably 3 to 8 N/16 μm. Preferred is 1 N/16 μm or more in view of mechanical strength when the microporous film is used as a separator and 12 N/16 μm or less in view of preventing film rupture during production due to extreme molecular orientation.

According to the present invention, the polyolefin microporous film preferably uses, as a polyethylene, a polyethylene having a terminal vinyl group concentration of 3 to 20/10,000 carbon atoms in the polyethylene as determined by infrared spectroscopy and containing 0.5 wt % or more of a component having a weight average molecular weight of 1,000 or less in that the film can achieve an excellent fuse effect while having film-rupture resistance, low shrinkability and high quality.

According to the present invention, the polyolefin microporous film preferably has a fuse temperature of 140° C. or lower under the temperature rise condition of 2° C./min. in view of safety during the temperature rise of the battery. More preferred is 138° C. or lower, more preferably 137° C. or lower, most preferably 136° C. or lower. Envisioning the use environment of the battery, preferred is 100° C. or higher, more preferably 120° C. or higher, still more preferably 130° C. or higher.

According to the present invention, the polyolefin microporous film preferably has a short-circuit temperature of 160° C. or higher, more preferably 170° C. or higher, still more preferably 180° C. or higher under the temperature rise condition of 2° C./min. in view of safety and heat resistance during the temperature rise of the battery.

According to the present invention, the polyolefin microporous film preferably has a thermal shrinkage (%) in each of the MD and TD at 100° C. of 30% or less, more preferably 20% or less, still more preferably 15% or less. When the thermal shrinkage is 30% or less, the microporous film less is thermally less shrinkable and less easily generates a problem that positive and negative electrodes short-circuit with each other during the production process of the battery.

In the polyolefin microporous film of the present invention, the linear relationship approximated by the least-squares method between the common logarithm values of the molecular weights M(i) determined by GPC/FTIR and the values of the terminal methyl group concentrations C (M(i)) preferably satisfies the following relation in the molecular weight range of M (i) 100,000 to 1,000,000 (inclusive).

$$C(M(i))=A\times\log(M(i))+B \quad (A \text{ and } B \text{ are constants})$$

$$-0.015 \leq A \leq 2.000$$

Each of the molecular weight distribution determined by GPC/FTIR measurement and the terminal methyl group concentration is the total of the values for polyethylene and polypropylene constituting the microporous film of the present invention. The molecular weight M(i) is a polyethylene-converted molecular weight. The terminal methyl group concentration C (M(i)) is defined as the ratio I ($-CH_3$)/I ($-CH_2-$) of the absorbance assigned to methyl groups I ($-CH_3$) (absorption wavelength: 2,960 $cm^{-1}$) to the absorbance assigned to methylene groups I ($-CH_2-$) (absorption wavelength: 2,925 $cm^{-1}$). Here, C (M(i)) represents the concentration of the sum of the side chain terminal methyl groups of the polymer and the main chain terminal methyl groups thereof. The side chain terminals approximately correspond to the side chain methyl groups of the polypropylene and have a high degree of influence on C (M(i)). Consequently, the correlation between M(i) and C (M(i)) enables the monitoring of the molecular weight distribution of polypropylene in the film.

When the microporous film of the present invention is used as a separator for a battery, the battery may be prepared, for example, by the following method.

The microporous film is first made into oblong shapes 10 to 100 mm wide and 200 mm to 2,000 mm long. These separators are superimposed on positive and negative electrodes in the order: positive electrode/separator/negative electrode/separator or negative electrode/separator/positive electrode/separator, which is then rolled in the form of a circular or flat scroll. In addition, this roll is housed in a battery can, into which an electrolyte is further poured.

The type of the battery according to the present invention is not particularly limited; however, it is preferably a nonaqueous electrolyte battery in view of the affinity between the polyolefin microporous film and the electrolyte. In addition, it is more preferably a lithium ion battery in view of that the use of the microporous film of the present invention as a separator can impart excellent safety thereto.

A preferred method for producing the microporous film of the present invention is described below.

The microporous film of the present invention can be obtained, for example, by the following steps: (a) melt-kneading polyethylene and polypropylene as source materials, a plasticizer, and an antioxidant in a nitrogen atmosphere; (b) extruding the molten material in a sheet form for cool solidification; (c) stretching the sheet at least in the uniaxial direction; (d) extracting the plasticizer; and (e) performing heat-setting.

The order and number of these steps are not particularly limited; however, preferred examples thereof include the following three types.

1. Step (a)→step (b)→step (c)→step (d)→step (e)
2. Step (a)→step (b)→step (c)→step (d)→step (c)→step (e)
3. Step (a)→step (b)→step (d)→step (c)→step (e)

More preferred is the above 1. or 2.

An antioxidant concentration in step (a) of 0.2 wt % or more based on the total amount of the whole source material composition melt-kneaded is preferable because it can prevent the heat deterioration of the polyolefin due to the reaction of the terminal vinyl groups during melting. More preferred is 0.4 wt % or more, still more preferably 0.5 wt % or more.

From the balance between the resultant effect and economy, preferred is also 3 wt % or less, more preferably 2 wt % or less.

The antioxidant is preferably a phenol antioxidant as a primary antioxidant. Specific examples thereof include 2,6-di-t-butyl-4-methylphenol, pentaerythrityl-tetrakis-[3-(3,5-di-t-butyl-4-hydroxyphenyl)propionate] and octadecyl-3-(3, 5-di-t-butyl-4-hydroxyphenyl)propionate. In addition, a secondary antioxidant may be used in combination therewith. Specific examples thereof include a phosphorus-based antioxidant such as tris(2,4-di-t-butylphenyl)phosphite and tetrakis(2,4-di-t-butylphenyl)-4,4-biphenylene-diphosphonite, and a sulfur-based antioxidant such as dilauryl-thio-dipropionate.

The plasticizer in step (a) refers to a nonvolatile solvent capable of forming a homogeneous solution at the melting point thereof or more when mixed with the source material resins. Examples thereof include hydrocarbons such as liquid paraffin and paraffin wax, di-2-ethylhexyl phthalate (DOP), diisodecyl phthalate, and diheptylphthalate. Among others, liquid paraffin is preferable.

The weight percentage of the plasticizer is preferably 20 wt % to 80 wt % (inclusive), more preferably 25 wt % to 75 wt % (inclusive) based on the total amount of the whole source material composition to be melt-kneaded in view of a film-forming property.

The plasticizer in step (a) may be a recycled product recovered in the microporous film production steps in view of economy. Methods for the recovery include a method involving recovering the plasticizer discharged outside the film in steps (b) and (c) to be described, and a method involving separating and recovering the plasticizer from a mixture of the extraction solvent and the plasticizer by a means such as distillation and phase separation in step (d).

A polymer other than polyolefin or other materials may be blended in such a range that the film-forming property is not compromised and the advantages of the present invention are not impaired. In addition, as needed, known additives may be mixed such as a metal soap (e.g., calcium stearate or zinc stearate), an ultraviolet absorber, a light stabilizer, an anti-static agent, an anti-fogging agent and a color pigment in such a range that the film-forming property is not compromised and the advantages of the present invention are not impaired.

Methods for the melt-kneading include a method which involves mixing in a Henschel mixer, a ribbon blender, a tumbler blender, or the like and then melt-kneading in a screw extruder (e.g., a single screw extruder or a twin screw extruder), a kneader, a Banbury mixer, or the like. The melt-kneading method is preferably performed using a continuously operable extruder. The twin screw extruder is more preferable in view of a kneading capacity. The plasticizer may be mixed with the source material resins using the above Henschel mixer or the like. The plasticizer may also be directly fed into an extruder during melt-kneading.

The temperature during the melt-kneading is preferably 140° C. or higher, more preferably 160° C. or higher, still more preferably 180° C. or higher in view of dispersibility. The temperature is also preferably 300° C. or lower, more preferably 280° C. or lower, still more preferably 260° C. or lower in view of preventing molecular deterioration. In the production process of the polyethylene microporous film, the wastage generated by cutting and aligning the TD edges of the film in steps (b) to (e) to be described may be remixed as source material, during melt-kneading, to such an extent that it does not impair the quality and performance of the polyolefin microporous film.

Methods for setting the terminal vinyl group concentration of a polyolefin microporous film to the range described in the present invention include a method involving regulating the blending amount of PEa in the whole source material composition of the polyolefin microporous film and a method involving regulating the terminal vinyl group concentration of PEa. Among these, the method involving regulating the blending amount of PEa is preferable because the resultant microporous film has physical properties easy to control. For example, when PEa having a terminal vinyl group concentration of 10/10,000 C is used, the approximate source material blending ratio for setting the terminal vinyl group concentration of a polyolefin microporous film to 2/10,000 C or more is 20 to 96 wt % of PEa to 4 to 30 wt % of polypropylene to 0 to 76 wt % of PEb when the total is taken to be 100 wt %. To set the terminal vinyl group concentration of a polyolefin microporous film to 4/10,000 C or more, the blending ratio is 40 to 96 wt % of PEa to 4 to 30 wt % of PP to 0 to 56 wt % of PE.

The melt-kneading step is preferably carried out under addition of an antioxidant at a high concentration as described above and further in a nitrogen atmosphere. This can prevent the molecular deterioration caused by the reaction of the terminal vinyl groups of PEa with oxygen due to shear exothermic heat during melt-kneading. As a result, the terminal vinyl group concentration of the polyolefin microporous film can be kept high to impart excellent characteristics.

Methods for forming the kneaded material obtained in step (a) into a sheet in step (b) include a method which involves solidifying the molten material by cooling. Examples of the cooling method include a method involving directly allowing to contact a cooled medium such as cold air and cooling water and a method involving allowing to contact a roll or pressing machine cooled with a refrigerant. The method involving allowing to contact a roll or pressing machine cooled with a refrigerant is preferable in that it is excellent in thickness control property.

Examples of the stretching method used in step (c) include MD uniaxial stretching using a roll stretching machine, TD uniaxial stretching using a tenter, successive biaxial stretching using a combination of a roll stretching machine and a tenter, and simultaneous biaxial stretching using a simultaneous biaxial tenter or a blown film process. Among others, in view of high strength and deformation resistance, the simultaneous biaxial stretching is preferable; the simultaneous biaxial stretching using a simultaneous biaxial tenter is more preferable. The area ratio after stretching is preferably 20 times or more, more preferably 30 times or more, still more preferably 40 times or more to keep the mechanical strength moderate. In view of economy and stability, preferred is also 100 times or less. The stretching temperature is preferably 100° C. or higher, more preferably 110° C. or higher, still more preferably 115° C. or higher. In addition, 135° C. or lower is preferable; 130° C. or lower is more preferable.

As described above, the polyolefin microporous film of the present invention can be thinned. The thin film here means a film having a thickness of about 10 µm or less. Controlling temperature distribution in the stretching machine is important for thinning the polyolefin microporous film. Particularly, the blending of polypropylene reduces the melt viscosity of the resin, which makes the thinning more difficult. However, according to the present invention, the thickness nonuniformity-preventing effect of long chain branching present in PEa enables the production of even a polyolefin microporous film 10 µm or less in thickness having a uniform thickness distribution, which has conventionally been difficult to produce.

The extraction solvent in step (d) is desirably a solvent which is a poor solvent for the polyolefin constituting the film, is a good solvent for the plasticizer and has a boiling point lower than the melting point of the polyolefin constituting the film. Examples of the extraction solvent include a hydrocarbon such as n-hexane and cyclohexane; a halogenated hydrocarbon such as methylene chloride and 1,1,1-trichloroethane; a non-chlorine-based halogenated solvent such as hydrofluoroether and hydrofluorocarbon; an alcohol such as ethanol and isopropanol; an ether such as diethyl ether and tetrahydrofuran; and a ketone such as acetone and methyl ethyl ketone. Solvents are properly selected from among the above and used alone or in a mixture. Among others, methylene chloride and methyl ethyl ketone are preferable.

The extraction solvent in step (d) may use a solvent recovered in step (d) as a recycled product in view of economy. Methods for the recovery include a method which involves separating and recovering the extraction solvent from a mixture of the extraction solvent and the plasticizer by distillation, phase separation or the like.

The plasticizer extraction may be performed by dipping the sheet obtained in step (c) in the above extraction solvent. Subsequently, the sheet is sufficiently dried.

The heat setting in step (e) is carried out by a predetermined relaxation operation in a predetermined temperature atmosphere using a tenter, a roll stretching machine, or the like. Before the relaxation, low-ratio stretching may be performed for the purpose of porosity control or the like. Here, the stretching ratio is preferably 1 to 3 times, more preferably 1 to 2 times. The temperature during stretching is preferably 100° C. or higher, more preferably 110° C. or higher. In addition, 135° C. or lower is preferable; 130° C. or lower is more preferable. The relaxation operation refers to an operation in which the MD and/or TD dimension of the film is once stretched and then slightly restored. Considering the thermal shrinkage of the stretched form, the restored dimension is preferably 1.0 or less times, more preferably 0.95 or less times, still more preferably 0.9 or less times the MD or TD dimension before the relaxation. In view of preventing the generation of wrinkles, 0.6 or more times is also preferable. The temperature during the relaxation is preferably 100° C. or higher, more preferably 110° C. or higher in view of thermal shrinkage. To set the porosity and permeability to suitable ranges, 140° C. or lower is preferable; 135° C. or lower is more preferable.

In addition, surface treatment such as electron beam irradiation, plasma exposure, ion beam irradiation, surfactant coating and chemical modification may be applied, as needed, to such an extent that the advantages of the present invention are not impaired.

Further, a laminated film can be prepared in which at least one layer of the polyolefin microporous film described in the present invention is used. A method for lamination is not particularly limited; however, methods such as coextrusion and bonding are possible. The microporous film of the present invention is preferably used in at least one side of the most outer layers of the separator in view of suppressing the heat shrinkage of the separator in the battery.

The polyethylene microporous film of the present invention can be suitably used in a separator for batteries.

EXAMPLES

The present invention will now be specifically described with reference to the following Examples, which are not intended to limit the scope of the invention. Various physical properties used in the present invention were measured by the following testing methods.

(1) Viscosity Average Molecular Weight

The viscosity average molecular weights of polyethylene and polyolefin microporous films were measured at a temperature of 135° C. using decalin as a solvent and calculated by the following equation from the viscosity $[\eta]$.

$[\eta]=6.77\times10^{-4}Mv^{0.67}$ (Chiang's equation)

For polypropylene, Mv was also calculated from the following equation.

$[\eta]=1.10\times10^{-4}Mv^{0.80}$ (2) Terminal Vinyl Group Concentration

A polyolefin microporous film was made to a thickness of about 1 mm using a hot press. Then, the terminal vinyl group concentration, i.e., the number of terminal vinyl groups/10,000 carbon atoms in the polyethylene (hereinafter, the unit is expressed as a number/10,000 C), of the resultant film was calculated from the absorbance measured at 910 $cm^{-1}$ with an infrared spectrophotometer (FTS60A/896/UMA300 manufactured by Varian Technologies Japan Ltd.), the density (g/$cm^3$) of the polyolefin microporous film and the thickness (mm) of the sample, by the following equation using the equation described in POLYMER LETTERS VOL. 2, PP. 339-341 as a reference. In this respect, the concentration was calculated by omitting decimals.

Terminal vinyl group concentration(number/10,000 C)=11.4×Absorbance/(Density·Thickness)

The density unit is g/$cm^3$, and the thickness unit is mm.

(3) Content (wt %) of Polypropylene in Polyolefin Microporous Film

Polyolefin microporous films in which the polyolefin contains 4, 9, 20, 30 and 40 wt % of polypropylene were provided and measured for the heat of fusion of crystals (J/g) assigned to polypropylene using a differential scanning calorimeter (DSC). The approximated straight line by the least-squares method was defined as a calibration curve, which indicates the relation of the propylene content (wt %) to the heat of fusion of propylene crystals and passes through the original point. Using the calibration curve, the content (wt %) of polypropylene in the polyolefin microporous film was determined from the heat of fusion of polypropylene crystals obtained using DSC. An example of the calibration curve obtained is shown in FIG. 1.

In this respect, the heat of fusion of crystals was determined by the following method. A sample for DSC was prepared by punching the polyolefin microporous film in the form of 5-mm diameter circles, which were then superposed so as to provide a weight of 3 mg, placed in an aluminium sample pan 5 mm in diameter and sealed with a crimping cover. The heat of fusion of propylene crystals was defined as the value measured when the sample was heated up from 30° C. until 200° C. at 10° C./min., then kept at 200° C. for 5 minutes, further cooled from 200° C. until 30° C. at 10° C./min., subsequently held at 30° C. for 5 minutes and again heated up from 30° C. until 200° C. at 10° C./min. in a nitrogen atmosphere using DSC manufactured by Shimadzu Corporation (product name: DSC-60A).

(4) Density (g/$cm^3$)

The density was measured by a density gradient tube method (23° C.) according to ASTM-D 1505.

(5) Film Thickness (μm)

The film thickness was measured at the room temperature of 23° C. using the micro thickness gage KBM (trademark) manufactured by Toyo Seiki Co. Ltd.

(6) Porosity (%)

A 10×10 cm sample was cut out of the microporous film and determined for the volume (cm³) and mass (g) thereof, followed by calculating the porosity from the volume and mass, and the film density (g/cm³) using the following equation.

Porosity=(Volume−Mass/Film Density)/Volume×100

The calculation was performed by setting the film density to 0.95 (g/cm³).

(7) Air Permeability (sec.)

The air permeability was measured using the Gurley air permeability tester G-B2 (trademark) manufactured by Toyo Seiki Co. Ltd. according to JIS P-8117.

(8) Puncture Strength (N/16 μm)

The microporous film was fixed on a sample holder having an aperture 11.3 mm in diameter using the Handy compression tester KES-G5 (trademark) manufactured by Kato Tech Co., Ltd. The central part of the fixed microporous film was then subjected to a puncture test at a needle tip curvature radius of 0.5 mm and a penetration speed of 2 mm/sec. in an atmosphere of 25° C., from which the raw puncture strength (N) was obtained as the maximum puncture load. The 16-μm film thickness-converted puncture strength (N/16 μm) was calculated by multiplying the above strength (N) by 16 (μm)/film thickness (μm).

(9) Fuse Temperature (° C.) and Film-Rupture (Short-Circuit) Temperature (° C.)

A schematic drawing of a fuse-temperature measurement device is illustrated in FIG. 2(A). 1 is a microporous film; 2A and 2B are nickel foils 10 μm in thickness; and 3A and 3B are glass plates. 4 is an electric resistance measurement device (LCR Meter "AG-4311" (trademark) manufactured by Ando Electric Co. Ltd.) which is connected to nickel foils 2A and 2B. 5 is a thermocouple which is connected to thermometer 6. 7 is a data collector which is connected to electric resistance measurement device 4 and thermometer 6. 8 is an oven which heats the microporous film.

Describing this in further detail, as shown in FIG. 2(B), microporous film 1 is superimposed on nickel foil 2A and fixed to nickel foil 2A in the longitudinal direction using a "Teflon" (registered trademark) tape (shaded area in the figure). Microporous film 1 is impregnated with 1 mole/litter of a lithium borofluoride solution (solvent:propylene carbonate/ethylene carbonate/γ-butyrolactone=1/1/2) as electrolyte solution. As shown in FIG. 2(C), a "Teflon" (registered trademark) tape (shaded area in the figure) was laminated on nickel foil 2B for masking with a 15×10 mm window portion left in the central region of nickel foil 2B.

Nickel foils 2A and 2B were superimposed on each other in such a manner that microporous film 1 was sandwiched therebetween; the two nickel foils were further held from opposing sides thereof using glass plates 3A and 3B. Here, the window portion of foil 2B was constrained to lie opposite microporous film 1.

The two glass plates were fixed by holding with commercial alligator clips. Thermocouple 5 was fixed to the glass plate using a "Teflon" (registered trademark) tape.

Using this device, the temperature and electric resistance are continuously measured. The temperature was increased from 25° C. until 200° C. at a speed of 2° C./min.; the electric resistance was measured with an alternating current of 1 V and 1 kHz. The fuse temperature was defined as a temperature where the electrical resistivity of the microporous film reached $10^3 \Omega$. The film-rupture (short-circuit) temperature was defined as a temperature when after fusing, the electrical resistivity again became down from $10^3 \Omega$.

(10) 100° C. Thermal Shrinkage (%)

The polyolefin microporous film was cut out in a 100 mm square in such a way that the sides of the film are parallel to the MD and TD, allowed to stand for one hour in an oven adjusted at the temperature of 100° C., and then measured for the MD and TD thermal shrinkages.

(11) MD Film Thickness Deviation (%)

Ten superimposed films obtained by cutting out the polyolefin microporous film in the form of strips of 1,000 mm (in the MD)×30 mm (in the TD) were measured for the film thickness in the total 20 points of the central region in the TD at 50-mm intervals in the MD. From the maximum, minimum and mean values of the resultant film thicknesses, the MD film thickness deviation was calculated using the following equation.

MD Film Thickness Deviation (%)=(Maximum Value−Minimum Value)/10/Mean Film Thickness×100

(12) Simple Oven Tests at 150° C. and 155° C.

A lithium ion battery in an uncharged state, prepared in the following procedure, was heated from 30° C. until 150° C. (or 155° C.) at a temperature rise rate of 5° C./min. and then kept at 150° C. (or 155° C.) for 10 minutes. The battery was cooled to room temperature and then dismounted to remove an electrode plate laminate. The following were visually checked: the presence of electrode exposure due to the heat shrinkage of a separator in the most outer part of the electrode plate laminate; the presence of the exposure of the upper and lower electrode edges in the direction perpendicular to the rolling direction of the battery; and the presence of separator breaking inside the electrode plate laminate. The presence of the electrode exposure or the braking was evaluated as "poor", and the absence thereof, as "good".

(13) Gas Impermeabilizing Temperature Measurement

A film obtained by the polyolefin microporous film being cut, 60 mm (in the MD)×60 mm (in the TD), was fixed to a 50-mm square metallic flask and subjected to a test involving heating at a constant temperature for 5 minutes. The temperature (gas impermeabilizing temperature) was measured at which the air permeability of the microporous film after heating exceeded 100,000 seconds.

[Procedure for Preparing Lithium Ion Battery]

a. Preparation of Nonaqueous Electrolyte

The nonaqueous electrolyte was prepared by dissolving LiPF6 as a solute in the mixed solvent of ethylene carbonate:ethylmethyl carbonate=1:2 (volume ratio) so as to provide a concentration of 1.0 mole/litter.

b. Preparation of Positive Electrode

A slurry was prepared by dispersing 92.2 wt % of the lithium-cobalt composite oxide $LiCoO^2$ as an active material, 2.3 wt % each of scaly graphite and acetylene black as conductant agents and 3.2 wt % of polyvinylidene fluoride (PVDF) as a binder in N-methylpyrrolidone (NMP). The slurry was coated, using a dye coater, on both sides of an aluminium foil 20 μm in thickness providing a positive-electrode collector, dried at 130° C. for 3 minutes, and then pressed using a roll press. Here, the coating amount and bulk density of the active material in the positive electrode were set so as to provide 250 g/m² and 3.00 g/cm³, respectively. The electrode was cut into a zonal shape to fit to the battery width.

c. Preparation of Negative Electrode

A slurry was prepared by dispersing 96.9 wt % of artificial graphite as an active material and 1.4 wt % of an ammonium salt of carboxymethylcellulose and 1.7 wt % of a styrene-butadiene copolymer latex as binders in purified water. The slurry was coated, using a dye coater, on both sides of a copper foil 12 μm in thickness providing a negative-electrode collector, dried at 120° C. for 3 minutes, and then pressed using a roll press. Here, the coating amount and bulk density of the active material in the negative electrode were set so as to provide 106 g/m² and 1.35 g/cm³, respectively. The electrode was cut into a zonal shape to fit to the battery width.

d. Battery Assembly

Zonal polyolefin microporous films cut into a width of about 42 mm (separators), a zonal positive electrode and a zonal negative electrode were superposed in the order: zonal negative electrode/separator/zonal positive electrode/separator, which was rolled several times in a scroll form and then pressed in a flat plate form to prepare an electrode plate laminate. The electrode plate laminate prepared in item (9) above was housed in an aluminium container; an aluminium lead derived from a positive-electrode collector was connected to a container wall, and a nickel lead derived from a negative-electrode collector, to a terminal on the container lid. In addition, the above-described nonaqueous electrolyte was poured into the container, which was then sealed.

Example 1

Using a tumbler blender, 91 wt % of a PEa (homopolymer) (hereinafter referred to as PEa-1) and 9 wt % of a polypropylene (homopolymer) (hereinafter referred to as PP-1) were dry-blended. PEa-1 had a Mv of 300,000, a density of 0.95 g/cm³ and a molecular weight distribution of 15, a terminal vinyl group concentration of 10/10,000 C and contained 1.2 wt % of a component having an Mw of 1,000 or less. PP-1 had an Mv of 400,000, a density of 0.91 g/cm³, a crystalline melting point of 162° C., a heat of fusion of crystals of 100 J/g, a crystallization temperature of 100° C., a melt tension (230° C.) of 6.8 g, a melt flow rate of 0.5 g/10 min. and an Mw/Mn of 5.9. To 99 wt % of the resultant polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend. The atmosphere in a feeder and a biaxial stretching machine was replaced with nitrogen; the resultant blend was fed to a twin screw extruder using the feeder. Liquid paraffin (kinematic viscosity at 37.78° C.: $7.59 \times 10^{-5}$ m²/s) was injected into a cylinder of the extruder using a plunger pump.

The feeder and pump were adjusted so that the ratio of liquid paraffin to the whole blend extruded with melt kneading was 60 wt %. The melt kneading was carried out at a preset temperature of 200° C., a screw speed of 280 rpm and a discharge rate of 10 kg/h.

Subsequently, the melt kneaded material was extruded onto a cooling roll controlled to the surface temperature of 80° C. through a T-die for casting to provide a gel sheet having a thickness of 1,400 μm.

The gel sheet was then guided to a simultaneous biaxial tenter stretching machine and biaxially stretched. The stretching conditions were a MD ratio of 7.0:1, a TD ratio of 6.4:1 and a preset temperature of 122° C.

Thereafter, the sheet was guided to a methyl ethyl ketone vessel and sufficiently dipped in methyl ethyl ketone to extract and remove liquid paraffin, followed by dry-removing methyl ethyl ketone.

In addition, the sheet was guided to a TD tenter, stretched at a low ratio, and further subjected to a relaxation operation. The stretching ratio was 1.4 times the film width in guiding to the TD tenter; the relaxation operation was performed at 125° C. and a ratio of 0.86 times the film width after stretching by the TD tenter.

The physical properties of the resultant microporous film are shown in Table 1. The resultant microporous film was cut in the form of strips of 30 mm (in the MD)×300 mm (in the TD); the central parts in the MD were measured at 10 mm intervals in the TD. Here, the film thickness standard deviation was 0.12 μm; the film thickness deviation was 2.8%. In addition, the standard deviation obtained when the MD film thickness deviation described in term (11) above was measured was 0.06 μm. The resultant microporous film had a small thickness deviation, and did not cause electrode exposure and separator breaking in the simple oven tests at 150° C. and 155° C.

Example 2

A microporous film was produced in the same way as in Example 1 except for using as source materials 10 wt % of PEa-1, 86 wt % of a PEb (homopolymer) (hereinafter referred to as PEb-1) and 4 wt % of PP-1 and setting the preset temperature of the simultaneous biaxial tenter stretching machine to 121° C. PEb-1 had a My of 280,000, a density of 0.95 g/cm³ and a terminal vinyl group concentration of 1/10,000 C and contained 0 wt % of a component having an Mw of 1,000 or less.

The physical properties of the resultant microporous film are shown in Table 1. The resultant microporous film had a small thickness deviation, and did not cause electrode exposure and separator breaking in the simple oven test at 150° C. However, electrode exposure was found in the 155° C. simple oven test.

Example 3

Using a tumbler blender, 70 wt % of PEa-1 and 30 wt % of PP-1 were dry-blended. To 99 wt % of the resultant polymer blend was added 1 wt % of pentaerythrityl-tetrakis-[3-(3,5-di-t-butyl-4-hydroxyphenyl)propionate] as an antioxidant, which was again dry-blended using the tumbler blender. The resultant blend was purged with nitrogen and then fed to a twin screw extruder using the feeder in a nitrogen atmosphere. Liquid paraffin (kinematic viscosity at 37.78° C.: $7.59 \times 10^{-5}$ m²/s) was injected into a cylinder of the extruder using a plunger pump.

The feeder and pump were adjusted so that the ratio of liquid paraffin to the whole blend extruded with melt kneading was 60 wt %. The melt kneading was carried out at a preset temperature of 200° C., a screw speed of 200 rpm and a discharge rate of 10 kg/h.

Subsequently, the melt kneaded material was extruded onto a cooling roll controlled to the surface temperature of 80° C. through a T-die for casting to provide a gel sheet having a thickness of 1,400 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 127° C.

In addition, the sheet was guided to a methyl ethyl ketone vessel and sufficiently dipped in methyl ethyl ketone to extract and remove liquid paraffin, followed by dry-removing methyl ethyl ketone.

Thereafter, the sheet was guided to a TD tenter and subjected to low-ratio stretching and heat setting. The ratio in the stretching section was 1.3 times the film width in guiding to the TD tenter; the heat setting section conditions were a temperature of 115° C. and a ratio of 0.85 times the film width after stretching by the TD tenter.

The physical properties of the resultant microporous film are shown in Table 1. The resultant microporous film had a small thickness deviation, and did not cause electrode exposure and separator breaking in the simple oven tests at 150° C. and 155° C.

Example 4

Using a tumbler blender, 40 wt % of PEa-1, 53 wt % of a PEb (homopolymer) (hereinafter referred to as PEb-2) and 7 wt % of PP-1 were dry-blended. PEb-2 had a Mv of 700,000, a density of 0.95 g/cm$^3$ and a terminal vinyl group concentration of 1/10,000 C and contained 0 wt % of a component having an Mw of 1,000 or less. To 99 wt % of the resultant pure polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using the feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin to the whole blend extruded with melt kneading was 65 wt %. The melt kneading was carried out under conditions of a preset temperature of 200° C., a screw speed of 150 rpm and a discharge rate of 10 kg/h.

Subsequently, the melt kneaded material was extruded onto a cooling roll controlled to the surface temperature of 60° C. through a T-die for casting to provide a gel sheet having a thickness of 1,350 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 122° C.

In addition, the sheet was guided to a methyl ethyl ketone vessel and sufficiently dipped in methyl ethyl ketone to extract and remove liquid paraffin, followed by dry-removing methyl ethyl ketone.

Thereafter, the sheet was guided to a TD tenter and subjected to low-ratio stretching and heat setting. The ratio in the stretching section was 1.3 times the film width in guiding to the TD tenter. The heat setting section conditions were a temperature of 126° C. and a ratio of 0.85 times the film width after stretching by the TD tenter.

The physical properties of the resultant microporous film are shown in Table 1. The resultant microporous film had a small thickness deviation, and did not cause electrode exposure and separator breaking in the simple oven test at 150° C. However, partial electrode exposure was found in the simple oven test at 155° C.

Example 5

A microporous film was produced in the same way as in Example 1 except for setting the gel sheet thickness to 800 μn and the preset temperature of the simultaneous biaxial tenter stretching machine to 120° C.

The physical properties of the resultant microporous film are shown in Table 1. The resultant microporous film had a small thickness deviation despite being a thin film having a thickness of 9 μm, and also did not cause electrode exposure and separator breaking in the simple oven tests at 150° C. and 155° C.

Example 6

Using a tumbler blender, 60 wt % of PEa-1, 31 wt % of PEb-2 and 9 wt % of PP-1 were dry-blended. To 99 wt % of the resultant pure polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using the feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin to the whole blend extruded with melt kneading was 65 wt %. The melt kneading was carried out at a preset temperature of 200° C., a screw speed of 280 rpm and a discharge rate of 10 kg/h.

Subsequently, the melt kneaded material was extruded onto a cooling roll controlled to the surface temperature of 80° C. through a T-die for casting to provide a gel sheet having a thickness of 1,350 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 122° C.

In addition, the sheet was guided to a methyl ethyl ketone vessel and sufficiently dipped in methyl ethyl ketone to extract and remove liquid paraffin, followed by dry-removing methyl ethyl ketone.

Thereafter, the sheet was guided to a TD tenter and subjected to low-ratio stretching and heat setting. The ratio in the stretching section was 1.5 times the film width in guiding to the TD tenter; the heat setting section conditions were a temperature of 123° C. and a ratio of 0.77 times the film width after stretching by the TD tenter.

The physical properties of the resultant microporous film are shown in Table 1. The resultant microporous film had a small thickness deviation, and did not cause electrode exposure and separator breaking in the simple oven tests at 150° C. and 155° C.

Example 7

Using a tumbler blender, 80 wt % of PEa-1 and 20 wt % of PP-1 were dry-blended. To 99 wt % of the resultant pure polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using the feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin to the whole blend extruded with melt kneading is 60 wt %. The melt kneading conditions were a preset temperature of 200° C., a screw speed of 280 rpm and a discharge rate of 10 kg/h.

Subsequently, the melt kneaded material was extruded onto a cooling roll controlled to the surface temperature of 80° C. through a T-die for casting to provide a gel sheet having a thickness of 1,700 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 119° C.

In addition, the sheet was guided to a methyl ethyl ketone vessel and sufficiently dipped in methyl ethyl ketone to extract and remove liquid paraffin, followed by dry-removing methyl ethyl ketone.

Thereafter, the sheet was guided to a TD tenter and subjected to low-ratio stretching and heat setting. The ratio in the stretching section was 1.65 times the film width in guiding to the TD tenter; the heat setting section conditions were a temperature of 120° C. and a ratio of 0.81 times the film width after stretching by the TD tenter.

The physical properties of the resultant microporous film are shown in Table 1. The resultant microporous film had a small thickness deviation, and also did not cause electrode exposure and separator breaking in the simple oven tests at 150° C. and 155° C.

Example 8

A microporous film was produced in the same way as in Example 7 except for using 10 wt % of PEa-1, 70 wt % of PEb-1 and 20 wt % of PP-1.

The physical properties of the resultant microporous film are shown in Table 1. The resultant microporous film had a small thickness deviation, and also did not cause electrode exposure and separator breaking in the simple oven test at 150° C. However, electrode exposure was found in the 155° C. simple oven test.

Example 9

A microporous film was produced in the same way as in Example 7 except for using 40 wt % of PEa-1, 40 wt % of PEb-1 and 20 wt % of PP-1.

The physical properties of the resultant microporous film are shown in Table 1. The resultant microporous film had a small thickness deviation, and also did not cause electrode exposure and separator breaking in the simple oven test at 150° C. However, partial electrode exposure was found in the simple oven test at 155° C.

Example 10

A microporous film was produced in the same way as in Example 7 except for using 60 wt % of PEa-1, 20 wt % of PEb-1 and 20 wt % of PP-1.

The physical properties of the resultant microporous film are shown in Table 1. The resultant microporous film had a small thickness deviation, and also did not cause electrode exposure and separator breaking in the simple oven test at 150° C.

Example 11

A microporous film was produced in the same way as in Example 7 except for using 40 wt % of PEa-1, 30 wt % of PEb-1 and 30 wt % of PP-1 and setting the ratio in the stretching section of the TD tenter to 1.7 times the film width in guiding to the TD tenter, the temperature of the heat setting section to 117° C. and the ratio in the setting section to 0.82 times the film width after stretching by the TD tenter.

The physical properties of the resultant microporous film are shown in Table 1. The resultant microporous film had a small thickness deviation, and also did not cause electrode exposure and separator breaking in the simple oven test at 150° C. However, partial electrode exposure was found in the simple oven test at 155° C.

Comparative Example 1

A microporous film was produced in the same way as in Example 2 except for using 96 wt % of PEb-1 and 4 wt % of PP-1.

The physical properties of the resultant microporous film are shown in Table 2. The microporous film had a high film-rupture resistance, but was inferior in low heat shrinkability and further had a large thickness deviation.

Comparative Example 2

A microporous film was produced in the same way as in Example 1 except for using 91 wt % of PEb-1.

The physical properties of the resultant microporous film are shown in Table 2. The microporous film had a high film-rupture resistance, but was inferior in low heat shrinkability and further had a large thickness deviation.

Comparative Example 3

Using a tumbler blender, 95 wt % of a PEb (homopolymer) and 5 wt % of PP-1 were dry-blended. The PEb had a Mv of 400,000, a density of 0.95 g/cm$^3$ and a terminal vinyl group concentration of 1/10,000 C and contained 0 wt % of a component having an Mw of 1,000 or less. To 99 wt % of the resultant pure polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using the feeder in a nitrogen atmosphere. Liquid paraffin (kinematic viscosity at 37.78° C.: 7.59×10$^{-5}$ m$^2$/s) was injected into a cylinder of the extruder using a plunger pump.

The feeder and pump were adjusted so that the ratio of liquid paraffin to the whole blend extruded with melt kneading was 60 wt %. The melt kneading was carried out at a preset temperature of 200° C., a screw speed of 200 rpm and a discharge rate of 12 kg/h.

Subsequently, the melt kneaded material was extruded onto a cooling roll controlled to the surface temperature of 25° C. through a T-die for casting to provide a gel sheet having a thickness of 1,250 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 121° C.

Next, the sheet was guided to a methyl ethyl ketone vessel and sufficiently dipped in methyl ethyl ketone to extract and remove liquid paraffin, followed by dry-removing methyl ethyl ketone.

In addition, the sheet was guided to a TD tenter and subjected to low-ratio stretching and heat setting. The ratio in the stretching section was 1.5 times the film width in guiding to the TD tenter; the heat setting section conditions were a temperature of 122° C. and a ratio of 0.87 times the film width after stretching by the TD tenter.

The physical properties of the resultant microporous film are shown in Table 2. For reference, the resultant microporous film was fixed to a 50-mm square metallic flask and subjected to a test involving heating at a constant temperature for 5 minutes. The temperature at which the air permeability of the microporous film after heating exceeded 100,000 seconds was 134° C.

The resultant microporous film had a high film-rupture resistance, but was inferior in low heat shrinkability and further had a large thickness deviation.

Comparative Example 4

Using a tumbler blender, 70 wt % of a first PEb (homopolyethylene), 27 wt % of a second PEb (homopolyethylene) and 3 wt % of PP-1 were dry-blended. The first PEb had a Mv of 200,000, a density of 0.95 g/cm$^3$ and a terminal vinyl group concentration of 1/10,000 C and contained 0 wt % of a component having an Mw of 1,000 or less. The second PEb had an Mv of 3,000,000, a density of 0.93 g/cm$^3$ and a terminal vinyl group concentration of 1/10,000 C and contained 0 wt % of a component having an Mw of 1,000 or less. To 99 wt % of the resultant pure polymer blend was added 1 wt % of pentaerythrityl-tetrakis-[3-(3,5-di-t-butyl-4-hydroxyphenyl)propionate] as an antioxidant, which was again dry-blended using the tumbler blender to provide a blend comprising the polymers. The resultant blend comprising the polymers was purged with nitrogen and then fed to a twin screw extruder using the feeder in a nitrogen atmosphere. Liquid paraffin (kinematic viscosity at 37.78° C.: 7.59×10$^{-5}$ m$^2$/s) was injected into a cylinder of the extruder using a plunger pump. The feeder and pump were adjusted so that the ratio of liquid paraffin to the whole blend extruded with melt kneading was 70 wt %. The melt kneading was carried out at a preset temperature of 230° C., a screw speed of 250 rpm and a discharge rate of 15 kg/h. Subsequently, the melt kneaded material was extruded onto a cooling roll controlled to the surface temperature of 30° C. through a T-die for casting to provide a gel sheet having a thickness of 1,700 μm.

The gel sheet was then guided to a simultaneous biaxial tenter stretching machine and biaxially stretched. The preset stretching conditions were a MD ratio of 7.0:1, a TD ratio of 6.4:1 and a preset temperature of 124° C.

Subsequently, the sheet was guided to a methyl ethyl ketone vessel and sufficiently dipped in methyl ethyl ketone to extract and remove liquid paraffin, followed by dry-removing methyl ethyl ketone.

In addition, the sheet was guided to a TD tenter and subjected to low-ratio stretching and heat setting. The ratio in the stretching section was 1.6 times the film width in guiding to the TD tenter. The heat setting section conditions were a temperature of 129° C. and a ratio of 0.81 times the film width after stretching by the TD tenter. The physical properties of the resultant microporous film are shown in Table 2.

The resultant microporous film had a high film-rupture resistance, but was inferior in low heat shrinkability and further had a large thickness deviation.

Comparative Example 5

A microporous film was produced in the same way as in Example 1 except for using only PEa-1 and setting the preset temperature of the simultaneous biaxial tenter stretching machine to 120° C.

The physical properties of the resultant microporous film are shown in Table 2. The resultant microporous film had low heat shrinkability, but was inferior in film-rupture resistance.

Comparative Example 6

A microporous film was produced in the same way as in Example 1 except for using only PEb-1 and setting the preset temperature of the simultaneous biaxial tenter stretching machine to 120° C.

The physical properties of the resultant microporous film are shown in Table 2. The resultant microporous film was inferior in both low heat shrinkability and film-rupture resistance.

Comparative Example 7

A microporous film was produced in the same way as in Example 7 except for using 80 wt % of PEb-1 and 20 wt % of PP-1 and setting the ratio in the stretching section of the TD tenter to 1.7 times the film width in guiding to the TD tenter and the ratio in the heat setting section to 0.82 times the film width after stretching by the TD tenter.

The physical properties of the resultant microporous film are shown in Table 2. The resultant microporous film was inferior in low heat shrinkability and further had a large thickness deviation.

Comparative Example 8

A microporous film was produced in the same way as in Example 7 except for using 70 wt % of PEb-1 and 30 wt % of PP-1 and setting the ratio in the stretching section of the TD tenter to 1.7 times the film width in guiding to the TD tenter, the temperature of the heat setting section to 117° C. and the ratio in the setting section to 0.82 times the film width after stretching by the TD tenter.

The physical properties of the resultant microporous film are shown in Table 2. The resultant microporous film was inferior in low heat shrinkability and further had a large thickness deviation.

Comparative Example 9

A microporous film was produced in the same way as in Comparative Example 4 except for using 65 wt % of a PEb (homopolyethylene) having an Mv of 200,000, a density of 0.95 g/cm$^3$, and a terminal vinyl group concentration of 1/10,000 C, 25 wt % of a PEb (homopolyethylene) having an Mv of 3,000,000, a density of 0.93 g/cm$^3$, and a terminal vinyl group concentration of 1/10,000 C and 10 wt % of PP-1 and setting the temperature of the heat setting section of the TD tenter to 127° C.

The physical properties of the resultant microporous film are shown in Table 2. The resultant microporous film had a high film-rupture resistance, but was inferior in low heat shrinkability and further had a large thickness deviation.

Reference Example 1

Using the device described in the testing method (9) in Examples, impedance was measured when a microporous film was heated up from 25° C. until 180° C. at 5° C./min. and then kept at 180° C. for 30 minutes (180° C. impedance measurement). In this respect, the test used, as electrodes, the positive and negative electrodes employed in the testing method (12) in place of the nickel foils A and B described in the testing method (9). In this test, the polyolefin microporous film described in Example 7 maintained the property of insulation the electrodes even after the test and was excellent in film-rupture resistance and shape retention.

Reference Example 2

A test similar to that in Reference Example 1 was carried out using Celgard (R) 2300 (manufactured by Celgard Inc.) as a polyolefin microporous film. As a consequence, the property of separating the electrodes was not sufficiently maintained. As a result of checking the state of the polyolefin microporous film after the test, the cause probably lies in that the film melted and flowed into the electrodes.

TABLE 1

| | Items | | Unit | Ex. 1 | Ex. 2 | Ex. 3 | Ex. 4 | Ex. 5 | Ex. 6 |
|---|---|---|---|---|---|---|---|---|---|
| Raw Material Composition | PEa | Mv | $10^4$ | 30 | 30 | 30 | 30 | 30 | 30 |
| | | Density | g/cm$^3$ | 0.95 | 0.95 | 0.95 | 0.95 | 0.95 | 0.95 |
| | | Molecular Weight Distribution | — | 15 | 15 | 15 | 15 | 15 | 15 |
| | | Terminal Vinyl Group Concentration | n/10000 C | 10 | 10 | 10 | 10 | 10 | 10 |
| | PEb | Mv | $10^4$ | | 28 | | 70 | | 70 |
| | | Density | g/cm$^3$ | | 0.95 | | 0.95 | | 0.95 |
| | | Terminal Vinyl Group Concentration | n/10000 C | | 1 | | 1 | | 1 |
| | Polypropylene | Mv | $10^4$ | 40 | 40 | 40 | 40 | 40 | 40 |
| | | Density | g/cm$^3$ | 0.91 | 0.91 | 0.91 | 0.91 | 0.91 | 0.91 |
| | | Heat of Fusion of Crystals | J/g | 100 | 100 | 100 | 100 | 100 | 100 |
| | PEa/PEb/Polypropylene | | wt % | 91/0/9 | 10/86/4 | 70/0/30 | 40/53/7 | 91/0/9 | 60/31/9 |
| Physical Property Values of Polyolefin Microporous Film | Terminal vinyl Group Concentration | | n/10000 C | 8 | 2 | 7 | 4 | 8 | 6 |
| | Film Thickness | | μm | 16 | 16 | 16 | 16 | 9 | 16 |
| | Porosity | | % | 41 | 42 | 40 | 43 | 36 | 45 |
| | Gas Permeability | | sec | 300 | 280 | 360 | 220 | 280 | 250 |
| | Penetration Strength | | N/16 μm | 3.7 | 3.6 | 3.2 | 4.1 | 4.9 | 3.8 |
| | | | g/16 μm | 380 | 370 | 330 | 420 | 500 | 390 |
| | Fuse Temperature | | °C. | 135 | 137 | 136 | 136 | 135 | 135 |
| | Short-Circuit Temperature | | °C. | >200 | >200 | >200 | >200 | >200 | >200 |
| | MD Film Thickness Deviation | | % | 1.2 | 1.2 | 1.9 | 1.2 | 1.1 | 1.2 |
| | 100° C. Thermal Shrinkage (MD) | | (%) | 5 | 5 | 13 | 7 | 4 | 7 |
| | 100° C. Thermal Shrinkage (TD) | | (%) | 4 | 4 | 10 | 4 | 3 | 4 |
| | Simple Oven Test at 150° C. | Electrode Exposure in Most Outer Part | — | Good | Good | Good | Good | Good | Good |
| | | Electrode Edge Exposure | — | Good | Good | Good | Good | Good | Good |
| | | Separator Breaking | — | Good | Good | Good | Good | Good | Good |
| | Simple Oven Test at 155° C. | Electrode Exposure in Most Outer Part | — | Good | Poor | Good | Good | Good | Good |
| | | Electrode Edge Exposure | — | Good | Poor | Good | Poor | Good | Good |
| | | Separator Breaking | — | Good | Good | Good | Good | Good | Good |
| | Heat of Fusion of Polypropylene Crystals | | J/g | 5.5 | 2.9 | 20.5 | 4.4 | 6.3 | 6.0 |
| | Polypropylene Content | | wt % | 8 | 4 | 30 | 7 | 9 | 9 |
| | Gas Impermeabilizing Temperature | | °C. | 128 | 131 | — | — | — | — |

| | Items | | Unit | Ex. 7 | Ex. 8 | Ex. 9 | Ex. 10 | Ex. 11 |
|---|---|---|---|---|---|---|---|---|
| Raw Material Composition | PEa | Mv | $10^4$ | 30 | 30 | 30 | 30 | 30 |
| | | Density | g/cm$^3$ | 0.95 | 0.95 | 0.95 | 0.95 | 0.95 |
| | | Molecular Weight Distribution | — | 15 | 15 | 15 | 15 | 15 |
| | | Terminal Vinyl Group Concentration | n/10000 C | 10 | 10 | 10 | 10 | 10 |
| | PEb | Mv | $10^4$ | | 28 | 28 | 28 | 28 |
| | | Density | g/cm$^3$ | | 0.95 | 0.95 | 0.95 | 0.95 |
| | | Terminal Vinyl Group Concentration | n/10000 C | | 1 | 1 | 1 | 1 |
| | Polypropylene | Mv | $10^4$ | 40 | 40 | 40 | 40 | 40 |
| | | Density | g/cm$^3$ | 0.91 | 0.91 | 0.91 | 0.91 | 0.91 |
| | | Heat of Fusion of Crystals | J/g | 100 | 100 | 100 | 100 | 100 |
| | PEa/PEb/Polypropylene | | wt % | 80/0/20 | 10/70/20 | 40/40/20 | 60/20/20 | 40/30/30 |
| Physical Property Values of Polyolefin Microporous Film | Terminal Vinyl Group Concentration | | n/10000 C | 8 | 2 | 4 | 6 | 4 |
| | Film Thickness | | μm | 16 | 16 | 16 | 16 | 16 |
| | Porosity | | % | 43 | 43 | 43 | 43 | 41 |
| | Gas Permeability | | sec | 350 | 350 | 340 | 360 | 360 |
| | Penetration Strength | | N/16 μm | 3.7 | 3.8 | 3.9 | 3.8 | 3.9 |
| | | | g/16 μm | 380 | 390 | 400 | 390 | 400 |
| | Fuse Temperature | | °C. | 135 | 137 | 135 | 135 | 135 |
| | Short-Circuit Temperature | | °C. | >200 | >200 | >200 | >200 | >200 |
| | MD Film Thickness Deviation | | % | 1.2 | 2.5 | 1.9 | 1.2 | 2.5 |
| | 100° C. Thermal Shrinkage (MD) | | (%) | 8 | 8 | 8 | 8 | 10 |
| | 100° C. Thermal Shrinkage (TD) | | (%) | 6 | 6 | 6 | 6 | 10 |
| | Simple Oven Test at 150° C. | Electrode Exposure in Most Outer Part | — | Good | Good | Good | Good | Good |
| | | Electrode Edge Exposure | — | Good | Good | Good | Good | Good |
| | | Separator Breaking | — | Good | Good | Good | Good | Good |
| | Simple Oven Test at 155° C. | Electrode Exposure in Most Outer Part | — | Good | Poor | Good | Good | Good |
| | | Electrode Edge Exposure | — | Good | Poor | Poor | Good | Poor |
| | | Separator Breaking | — | Good | Good | Good | Good | Good |
| | Heat of Fusion of Polypropylene Crystals | | J/g | 12.9 | 13.7 | 13.0 | 14.3 | 20.5 |
| | Polypropylene Content | | wt % | 19 | 20 | 19 | 21 | 30 |

TABLE 2

| | Items | | Unit | Comp. Ex. 1 | Comp. Ex. 2 | Comp. Ex. 3 | Comp. Ex. 4 | Comp. Ex. 5 |
|---|---|---|---|---|---|---|---|---|
| Raw Material Composition | PEa | Mv | $10^4$ | | | | | 30 |
| | | Density | g/cm$^3$ | | | | | 0.95 |
| | | Molecular Weight Distribution | — | | | | | 15 |
| | | Terminal Vinyl Group Concentration | n/10000 C | | | | | 10 |
| | PEb | Mv | $10^4$ | 28 | 28 | 40 | 20 | 300 |
| | | Density | g/cm$^3$ | 0.95 | 0.95 | 0.95 | 0.95 | 0.93 |
| | | Terminal Vinyl Group Concentration | n/10000 C | 1 | 1 | 1 | 1 | 1 |
| | Polypropylene | Mv | $10^4$ | 40 | 40 | 40 | 40 | |
| | | Density | g/cm$^3$ | 0.91 | 0.91 | 0.91 | 0.91 | |
| | | Heat of Fusion of Crystals | J/g | 100 | 100 | 100 | 100 | |
| | PEa/PEb/Polypropylene | | wt % | 0/96/4 | 0/91/9 | 0/95/5 | 0/97/3 | 100/0/0 |
| Physical Property Values of Polyolefin Microporous Film | Terminal Vinyl Group Concentration | | n/10000 C | 1 | 1 | 1 | 1 | 10 |
| | Film Thickness | | μm | 16 | 16 | 16 | 20 | 16 |
| | Porosity | | % | 41 | 41 | 44 | 41 | 42 |
| | Gas Permeability | | sec | 290 | 280 | 250 | 450 | 330 |
| | Penetration Strength | | N/16 μm | 3.9 | 3.8 | 4.8 | 4.0 | 3.9 |
| | | | g/16 μm | 400 | 390 | 490 | 410 | 400 |
| | Fuse Temperature | | °C. | 139 | 139 | 139 | 139 | 135 |
| | Short-Circuit Temperature | | °C. | >200 | >200 | >200 | >200 | 154 |
| | MD Film Thickness Deviation | | % | 3.1 | 3.1 | 3.1 | 4.0 | 1.2 |
| | 100° C. Thermal Shrinkage (MD) | | (%) | 5 | 5 | 4 | 1 | 5 |
| | 100° C. Thermal Shrinkage (TD) | | (%) | 4 | 4 | 3 | 2 | 4 |
| | Simple Oven Test at 150° C. | Electrode Exposure in Most Outer Part | — | Poor | Poor | Poor | Poor | Good |
| | | Electrode Edge Exposure | — | Poor | Poor | Poor | Poor | Good |
| | | Separator Breaking | — | Good | Good | Good | Good | Poor |
| | Simple Oven Test at 155° C. | Electrode Exposure in Most Outer Part | — | Poor | Poor | Poor | Poor | Good |
| | | Electrode Edge Exposure | — | Poor | Poor | Poor | Poor | Good |
| | | Separator Breaking | — | Good | Good | Good | Good | Poor |
| | Heat of Fusion of Polypropylene Crystals | | J/g | 2.6 | 5.8 | 3.4 | 2.0 | 0 |
| | Polypropylene Content | | wt % | 4 | 9 | 5 | 3 | 0 |
| | Gas Impermeabilizing Temperature | | °C. | — | — | 134 | — | — |

| | Items | | Unit | Comp. Ex. 6 | Comp. Ex. 7 | Comp. Ex. 8 | Comp. Ex. 9 |
|---|---|---|---|---|---|---|---|
| Raw Material Composition | PEa | Mv | $10^4$ | | | | |
| | | Density | g/cm$^3$ | | | | |
| | | Molecular Weight Distribution | — | | | | |
| | | Terminal Vinyl Group Concentration | n/10000 C | | | | |
| | PEb | Mv | $10^4$ | 28 | 28 | 28 | 20 | 
| | | Density | g/cm$^3$ | 0.95 | 0.95 | 0.95 | 0.95 |
| | | Terminal Vinyl Group Concentration | n/10000 C | 1 | 1 | 1 | 1 |
| | Polypropylene | Mv | $10^4$ | | 40 | 40 | 40 |
| | | Density | g/cm$^3$ | | 0.91 | 0.91 | 0.91 |
| | | Heat of Fusion of Crystals | J/g | | 100 | 100 | 100 |
| | PEa/PEb/Polypropylene | | wt % | 0/100/0 | 0/80/20 | 0/70/30 | 0/90/10 |
| Physical Property Values of Polyolefin Microporous Film | Terminal Vinyl Group Concentration | | n/10000 C | 1 | 1 | 1 | 1 |
| | Film Thickness | | μm | 16 | 16 | 16 | 20 |
| | Porosity | | % | 41 | 41 | 43 | 40 |
| | Gas Permeability | | sec | 310 | 390 | 400 | 480 |
| | Penetration Strength | | N/16 μm | 3.9 | 4.0 | 4.1 | 4.0 |
| | | | g/16 μm | 400 | 410 | 420 | 410 |
| | Fuse Temperature | | °C. | 139 | 139 | 139 | 139 |
| | Short-Circuit Temperature | | °C. | 148 | >200 | >200 | >200 |
| | MD Film Thickness Deviation | | % | 1.2 | 5.0 | 6.3 | 6.3 |
| | 100° C. Thermal Shrinkage (MD) | | (%) | 5 | 7 | 10 | 2 |
| | 100° C. Thermal Shrinkage (TD) | | (%) | 4 | 6 | 10 | 2 |
| | Simple Oven Test at 150° C. | Electrode Exposure in Most Outer Part | — | Poor | Poor | Poor | Poor |
| | | Electrode Edge Exposure | — | Poor | Poor | Poor | Poor |
| | | Separator Breaking | — | Poor | Good | Good | Good |
| | Simple Oven Test at 155° C. | Electrode Exposure in Most Outer Part | — | Poor | Poor | Poor | Poor |
| | | Electrode Edge Exposure | — | Poor | Poor | Poor | Poor |
| | | Separator Breaking | — | Poor | Good | Good | Good |
| | Heat of Fusion of Polypropylene Crystals | | J/g | 0 | 13.8 | 21.2 | 7.0 |
| | Polypropylene Content | | wt % | 0 | 20 | 31 | 10 |

INDUSTRIAL APPLICABILITY

The polyolefin microporous film of the present invention can be suitably used in a separator for electrochemical reaction apparatuses such as a battery, a capacitor and a fuel cell and in membrane filters for removing viruses and impurities.

The invention claimed is:

1. A polyolefin microporous film comprising a polyethylene and a polypropylene having a viscosity average molecular weight of 100,000 or more, wherein the polyolefin microporous film has a content of the polypropylene of 4 to 30 wt % and a terminal vinyl group concentration of 2 or more and 20 or less per 10,000 carbon atoms in the polyolefin constituting the microporous film as determined by infrared spectroscopy, wherein the MD film thickness deviation (%) of the polyolefin microporous film is 3% or less, the MD film thickness deviation being determined according to the following procedure:

10 strips measuring 1000 mm (MD) by 30 mm (TD) were cut from a polyolefin microporous film, superimposed on one another and measured for film thickness at 20 locations in a central region of the TD at 50 mm intervals in the MD and Maximum, Minimum and Mean values of the film thickness were determined from the film thicknesses measured and used in the following equation

*MD* Film Thickness Deviation (%)=(Maximum Value−Minimum Value)/10/Mean Film Thickness×100.

2. The polyolefin microporous film according to claim 1, wherein the microporous film comprises 7 to 30 wt % of the polypropylene.

3. The polyolefin microporous film according to claim 2, wherein the terminal vinyl group concentration per 10,000 carbon atoms in the polyolefin constituting the microporous film is 4 or more and 20 or less.

4. The polyolefin microporous film according to claim 2, wherein the microporous film comprises 9 to 30 wt % of a polypropylene having a viscosity average molecular weight of from 100,000 (inclusive) to less than 1,000,000.

5. The polyolefin microporous film according to claim 2, wherein the microporous film comprises 15 to 30 wt % of a polypropylene having a viscosity average molecular weight of from 100,000 (inclusive) to less than 1,000,000.

6. The polyolefin microporous film according to claim 3, wherein the terminal vinyl group concentration per 10,000 carbon atoms in the polyolefin constituting the microporous film is 5 to 20.

7. The polyolefin microporous film according to claim 3, wherein the terminal vinyl group concentration per 10,000 carbon atoms in the polyolefin constituting the microporous film is 6 to 20.

8. The polyolefin microporous film according to claim 3, wherein the microporous film comprises 20 to 93 wt % of a polyethylene having 5 to 20 terminal vinyl groups and 7 to 30 wt % of a polypropylene having a viscosity average molecular weight of from 100,000 (inclusive) to less than 1,000,000 and has a terminal vinyl group concentration of 4 to 20 per 10,000 carbon atoms in the polyolefin constituting the microporous film.

9. The polyolefin microporous film according to claim 3, wherein the microporous film comprises a polyethylene having 5 to 20 terminal vinyl groups and 0.5 to 10 wt % of a component having a molecular weight of 1,000 or less, as determined by gel permeation chromatography.

10. A separator for batteries made of the polyolefin microporous film described in any one of claims 1 to 9.

11. A battery containing the polyolefin microporous film described in any one of claims 1 to 9.

* * * * *